United States Patent
Weed et al.

(10) Patent No.: US 7,251,549 B2
(45) Date of Patent: Jul. 31, 2007

(54) METHOD AND APPARATUS FOR STOPPING AND PARKING A COMMERCIAL VEHICLE

(75) Inventors: Thomas J. Weed, Norton, OH (US); Kenneth A. Grolle, Elyria, OH (US); Joseph M. Macnamara, Ashland, OH (US); Kirit A. Thakkar, Parma, OH (US); Majed M. Hamdan, North Olmsted, OH (US)

(73) Assignee: Bendix Commercial Vehicle Systems, LLC, Elyria, OH (US)

(*) Notice: Subject to any disclaimer, the term of this patent is extended or adjusted under 35 U.S.C. 154(b) by 213 days.

(21) Appl. No.: 10/604,694

(22) Filed: Aug. 11, 2003

(65) Prior Publication Data

US 2004/0111207 A1    Jun. 10, 2004

Related U.S. Application Data

(63) Continuation-in-part of application No. 10/218,246, filed on Aug. 14, 2002, now Pat. No. 6,909,956.

(51) Int. Cl.
*G01M 17/00* (2006.01)
*G06F 7/00* (2006.01)
*G06F 19/00* (2006.01)

(52) U.S. Cl. .......................... 701/29; 701/34; 701/36; 701/70; 701/118; 123/179.4; 192/220.1; 180/204

(58) Field of Classification Search ................. 701/29, 701/36, 34, 70, 118; 123/179.4; 192/220.1; 180/204
See application file for complete search history.

(56) References Cited

U.S. PATENT DOCUMENTS 3,657,720 A    4/1972  Avdenko et al.
3,944,972 A    3/1976  Chandler
4,080,537 A    3/1978  Bucher
4,227,588 A    10/1980 Biancardi
4,309,882 A    1/1982  Maiocco
4,652,057 A    3/1987  Engle et al.
5,719,551 A    2/1998  Flick
5,815,822 A    9/1998  Iu
6,313,740 B1   11/2001 Goetz
6,421,593 B1   7/2002  Kempen et al.
6,738,697 B2*  5/2004  Breed ........................ 701/29
6,850,824 B2*  2/2005  Breed ........................ 701/36
2001/0038239 A1  11/2001  Ehrlich et al.
2001/0056544 A1  12/2001  Walker

FOREIGN PATENT DOCUMENTS

DE       19736915 A    8/1997
DE       19846788 A    10/1998
WO       WO 99/65581 A 12/1999
WO       WO 99/65681 A 12/1999

* cited by examiner

*Primary Examiner*—Thomas Black
*Assistant Examiner*—McDieunel Marc
(74) *Attorney, Agent, or Firm*—Calfee, Halter & Griswold LLP (57) ABSTRACT

A receiver capable of receiving a remote vehicle stop request signal is mounted to a commercial vehicle and connected to the vehicle antilock braking ECU by a vehicle communication bus. The receiver may also be capable of transmitting a signal, thereby allowing the desired vehicle to be isolated. Furthermore, a user input device may be mounted to the vehicle that allows manual input of a park signal. When the park signal has been received by the vehicle ECU, the vehicle braking system is employed, thereby preventing the movement of the vehicle.

19 Claims, 7 Drawing Sheets

START/PARK METHOD
FIG. 2

FIG. 1

REMOTE STOP

FIG. 3A

FIG. 3C
REMOTE STOP W/TRANCEIVER LOGIC

FIG. 3D

REMOTE STOP W/RESET TIMER

COMBINE PARK/RELEASE
AND REMOTE STOP METHOD

METHOD AND APPARATUS FOR STOPPING AND PARKING A COMMERCIAL VEHICLE

CROSS REFERENCE TO RELATED APPLICATIONS

This application is a continuation-in-part of U.S. patent application Ser. No. 10/218,246 filed Aug. 14, 2002 now U.S. Pat. No. 6,909,956 for METHOD & APPARATUS FOR STOPPING & PARKING A COMMERCIAL VEHICLE, the entire disclosure of which is fully incorporated herein by reference.

BACKGROUND OF INVENTION

This invention relates to a method and apparatus for securing a vehicle, and more specifically to a method and apparatus for stopping and parking a vehicle.

Theft of vehicles, especially commercial vehicles used for hauling hazardous or flammable materials, is becoming a major issue of concern throughout the world. Vehicles hauling such materials can be stolen or hijacked and used to cause mass destruction. Additionally, a commercial vehicle may need to be stopped for reasons other than suspected terrorism. This may include any potential reason where the continued path of the vehicle may create a potentially dangerous situation.

Currently, there is no known method of stopping a commercial vehicle remotely without the use of an external force. In many situations, an external force that is employed to stop a commercial vehicle, including blowing out tires, blocking the path of the vehicle, and ramming the vehicle, can be extremely dangerous and lead to deadly outcomes. Accordingly, a need exists for remotely stopping a commercial vehicle in a controlled and safe manner.

Additionally, a need exists to provide further security to parked commercial vehicles, especially those that may cause destruction prior to being able to be stopped by a remote system.

SUMMARY OF INVENTION

A method and apparatus for securing a vehicle from theft or hijacking is provided. One aspect of the present invention is a method and apparatus for stopping or parking a vehicle by sending a secured signal to the vehicle antilock braking ECU. In one embodiment, a receiver is used to receive a remote vehicle stop request signal. The receiver can be connected to the vehicle antilock braking ECU by a vehicle communication bus, a dedicated connection or a wireless connection. In another embodiment, a operator input device is used to generate a vehicle park signal. The operator input device can be connected to the vehicle antilock braking ECU by a vehicle communication bus or can be a wireless connection.

Another aspect of the present invention is a method and apparatus for stopping a specific vehicle. In one embodiment, a transceiver is used to remotely receive a signal from a remote user. The transceiver can then be used to send a vehicle identifier signal to the remote user, thereby allowing isolation of a vehicle stop request signal to a specific vehicle.

In another embodiment of the present invention, a satellite communication system, such as a telematic device is used to relay information to the vehicle indicating and commencing a stop sequence.

DETAILED DESCRIPTION

Figure 1:
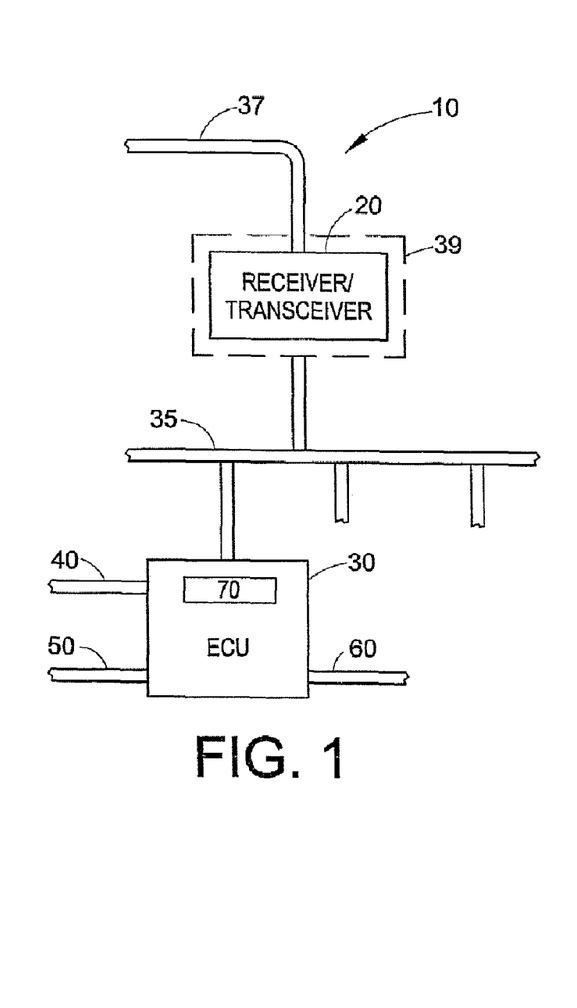
FIG. 1 is a schematic of a system for stopping a vehicle.

A system for stopping and parking a vehicle, generally referenced as 10 in FIG. 1, includes an apparatus 20 for receiving a signal, either from within the cab of a commercial vehicle or from a remote source, and sending such signal to the ECU 30, or other circuitry, used for the antilock braking/traction control system. A remote source can be any location away from the standard means for stopping or parking a vehicle, and thus may include apparatuses on a vehicle, or even within the vehicle cabin, as described further herein. The apparatus 20 may be any type of circuit such as, for example, a receiver that is capable of receiving a wireless signal, including, but not limited to, radio frequency, infrared, or optical signals or satellite transmissions sent from a remote location. The signal received by the apparatus 20 may be encoded or encrypted to ensure only authorized signals are processed by the system 10. Additionally, as will be discussed in greater detail below, the apparatus 20 may also be capable of transmitting a signal back to the source of the received signal. The apparatus 20 may receive a remote signal or the signal may be input from a plug-in device, or even manually triggered by the operation of a button or switch. The plug-in device and manual trigger would be especially useful in the parking functions of this invention discussed below.

The apparatus 20 may be located on the trailer, on the tractor, in the tractor cab, or any combination thereof. Since the apparatus 20 may transmit a signal to the antilock braking system ECU 30 along conventional communications busses 35, the only requirement regarding the location of the apparatus 20 is it must be capable of receiving power and a ground 37, but not necessarily from the vehicle as the apparatus may also be self-powered. However, since virtually every location on a truck or trailer is capable of receiving power and a ground wiring 37, the apparatus 20 may be placed in a variety of locations. For example, if it is desirable to place the apparatus 20 on the truck trailer, power may be received from the Power Line Carrier (PLC) thereby minimizing the harnessing needs of the system 10. The apparatus 20 may communicate along a number of existing vehicle busses 35, including J2497 (PLC), J1939 (CAN), J1587 (Diagnostic) or IEEE 1394.

The location of the apparatus 20 may depend on the desired functionality. For example, if the apparatus 20 is employed to maintain the vehicle in the parked position, the apparatus 20 may be a located within the truck cabin. The location of the apparatus 20 within the cabin may also be useful to prevent truck-jackings. In other circumstances, it may be desirable to place the apparatus 20 on the trailer, thereby ensuring that the apparatus 20 stays with the dangerous material when the trailer switches cabs. Under these circumstances, only certain trailers, i.e. those carrying hazardous materials or would otherwise warrant additional security, would need to be equipped with the apparatus 20. Additionally, if there is concern regarding the disablement of the system 10, the apparatus 20 may be located in a secure area 39, such as a encasement under lock and key or a permanent enclosure. In such cases, it is only important that the apparatus 20 be capable of receiving a signal. Furthermore, if desirable, more than one apparatus 20 may be placed on the vehicle.

Upon receiving a signal, the apparatus 20 may send a signal over one or more of the vehicle communication busses 35 to the antilock braking/traction control ECU 30. Although it would be preferred to use existing vehicle communication busses, one skilled in the art should appreciate that additional wiring and harnessing may be provided to maintain a separate communication bus for this invention. Furthermore, the signal from the apparatus 20 to the ECU 30 may also be sent by an appropriate wireless means. The signal received by the ECU 30 is processed and a signal 40 is sent to apply the primary brakes. If desirable, the different signals may be sent to the apparatus 20, and then to the ECU 30, to provide different brake pressures. For example, a first signal may be made to apply the brakes in moderation and thereby slowly stop the vehicle. However, if the situation warrants a quicker stop of the vehicle, a second signal may be made to apply full brake pressure to the vehicle. Regardless of the amount of brake pressure applied, the antilock braking and traction control system should be operable during the entire braking event to allow for continued control of the vehicle. Optionally, the ECU 30 may also send a signal 50 to the vehicle engine commanding minimal engine torque. The minimal engine torque signal will prevent the driver of the vehicle from attempting to override the vehicle braking system by increasing the power to the engine. Additionally, the ECU may cooperate with an engine retarder or an engine kill switch. Optionally, if the vehicle is parked or has come to a stop, the ECU 30 may send a signal 60 to drain the air brake system reservoir pressure, thereby apply the vehicle's spring brakes. Preferably, once the signal is received by the ECU 30 from the apparatus 20, the stop/park command is stored in the vehicle's non-volatile memory 70, thereby preventing the operator from erasing the command merely by turning the vehicle off and back on.

Figure 2:
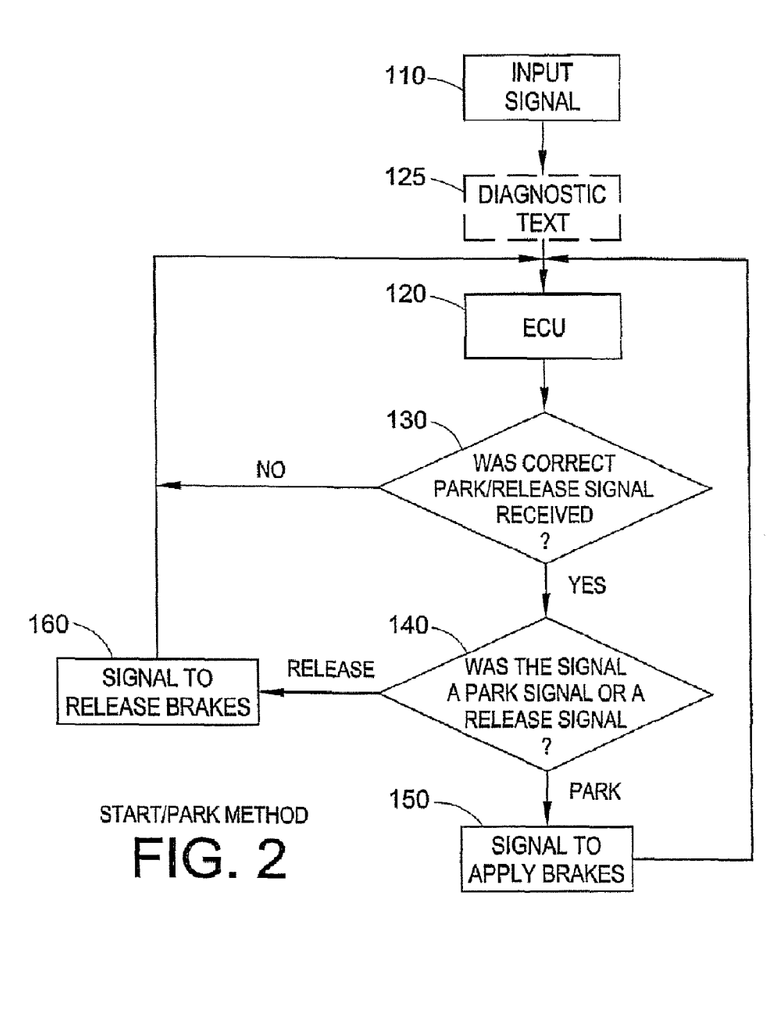
FIG. 2 is a flow diagram illustrating a park/release method.

FIG. 2 illustrates a flow chart of a method of parking a commercial vehicle, generally referenced as 100. The method 100 begins with the operator providing an input signal 110. As mentioned above, the input signal 110 may be generated by a plug-in device or by the depression of a button or switch. Preferably the input signal 110 is either a plug-in device that acts as a key, a plug-in device with a set code that allows the generation of the signal 110, a button or set of buttons with a set code that allows generation of the signal 110, or a button that is hidden from view or under lock and key. Once the signal 110 is generated, it is transmitted to the vehicle ECU 120 for processing. Optionally in step 125, the system may undergo diagnostic testing to determine whether or not the signal 110 may be generated and received by the ECU 120. If the diagnostic testing sequence 125 is used, a failure to detect the ability to receive a signal 110 may be used to initiate a park sequence, thereby rendering the vehicle inoperable.

The ECU 120 then determines at step 130 whether a correct park/release signal has been received. If the correct park/release signal was not received, the process loops back around and looks for another signal from the operator. If the correct park/release signal has been received from the operator, the ECU then determines in step 140 whether the signal was a park or release signal. The park signal may be the same or different from the release signal. If the signals are the same, the ECU may retrieve the last signal received and designate the new signal as the opposite. If the ECU determines that a park signal has been received, the ECU sends a signal at step 150 to apply the vehicle brakes. The signal generated in step 150 may either go towards applying the primary brakes, wherein air pressure is maintained within the air brake lines, or towards applying the vehicle spring brakes, wherein the pressure is released from the air supply reservoirs. The method then loops back around and looks for another signal from the operator. If the ECU determines that a release signal has been received, the ECU sends a signal at step 160 to release the brakes, either the primary brakes or the spring brakes. The method then loops back around and looks for another signal from the operator.

FIGS. 3A-3D illustrate the remote stop method, generally referenced as 200. In the embodiment illustrated in FIG. 3A, a remote sender transmits a remote signal 210 that is received by receiver 220. Optionally, diagnostic testing may be provided at step 225. As with the park/release method 100, if the diagnostic testing sequence 225 is used, the failure to detect the receiver 220 may be used to initiate a park sequence if the vehicle is parked, or a stop sequence if the vehicle is moving.

Figure 3A:
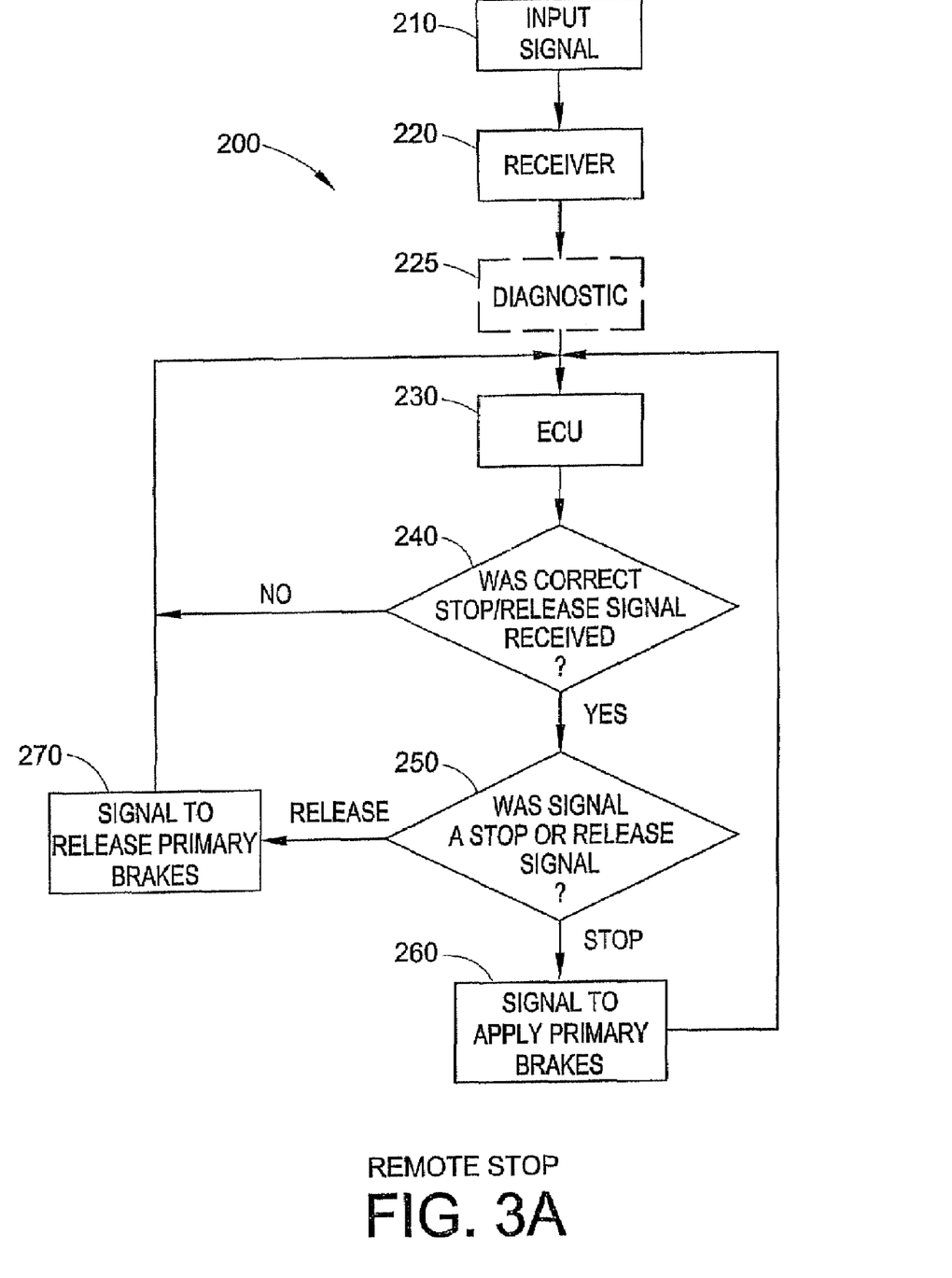
FIG. 3A is a flow diagram illustrating a stop/release method.

The signal from the receiver 220 is then sent to the vehicle ECU in step 230 which then processes the signal to determine whether a correct stop/release signal was received at step 240. If an incorrect signal has been received, the method loops back and looks for another signal 210 from the remote user. If a correct stop/release signal was received, the ECU processes to the signal at step 250 to determine whether the signal was a stop signal or a brake release signal. As with the park/release method 100, the stop signal may be the same or different from the brake release signal. If a stop signal has been received, the ECU sends a signal at step 260 to apply the primary brakes, and then the method loops back around to look for another signal 210. If a brake release signal has been received, the ECU sends a signal at step 270 to release the primary brakes, and then the method loops back around to look for another signal 210.

Figure 3B:
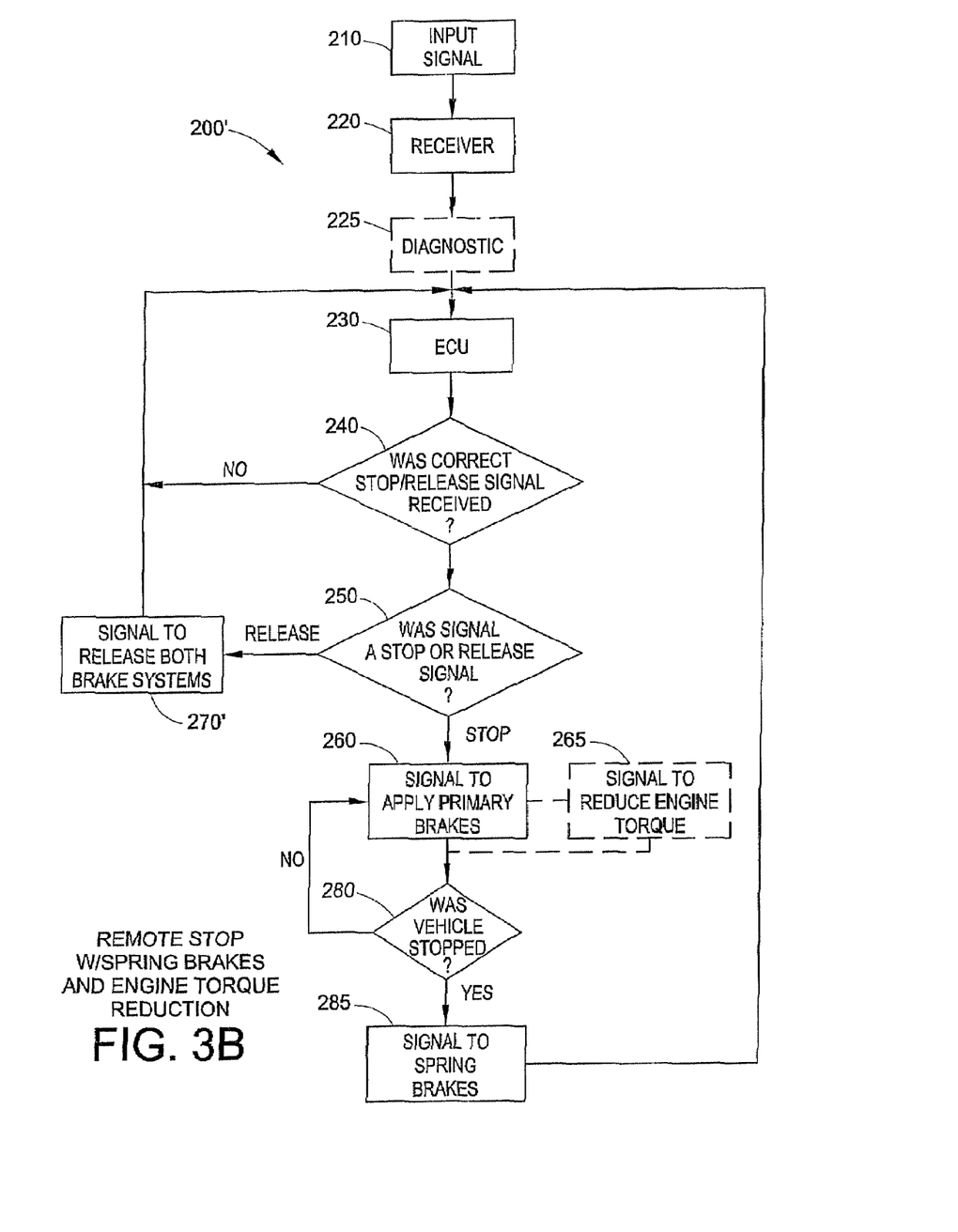
FIG. 3B is a flow diagram illustrating the stop/release method illustrated in FIG. 3A, and incorporating a spring brake activation sequence and optional engine torque reduction sequence.

FIG. 3B illustrates a remote stop method 200", which incorporates a spring brake activation sequence and optional engine torque reduction sequence. As the ECU sends a signal to apply the primary brakes in step 260, the ECU may also send a signal at step 265 to the engine to reduce the available torque. This prevents the vehicle driver from attempting to override the brake system by throttling the engine. The ECU then determines at step 280 whether or not the vehicle has come to a stop. If the vehicle has not stopped, the primary brakes continue to stop the vehicle. If the vehicle has stopped, the ECU sends a signal at step 285 to deplete the air supply reservoirs and thereby engage the spring breaks. Additionally, at step 270" the brake release signal must be directed to both the primary and secondary brake systems.

Figure 3C:
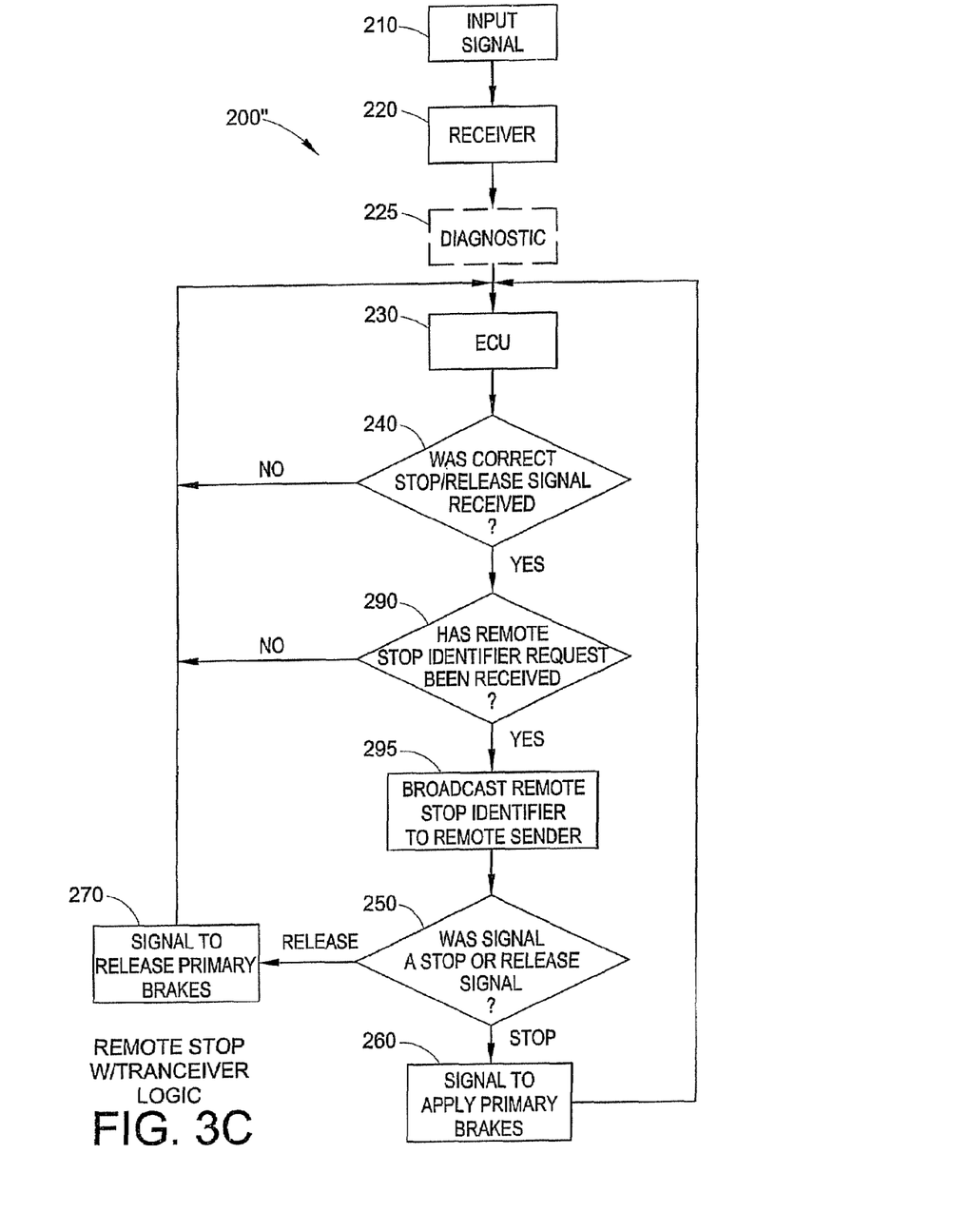
FIG. 3C is a flow diagram illustrating the stop/release method illustrated in FIG. 3A, and incorporating transceiver logic.

FIG. 3C illustrates a remote stop method 200"", which incorporates transceiver logic. In this method 200"", after the ECU verifies that a correct remote signal 210 has been received, the ECU determines, at step 290, whether a remote stop identifier request signal has been received. The remote stop identifier request signal is used to verify that only the intended vehicle receives a stop signal. This may be important when there are multiple vehicles with remote stop systems in a close proximity. If the remote stop identifier request signal has not be received, then method loops back and looks for another signal 210 from the remote user. If the remote stop identifier request signal has been received, then transceiver 220" broadcasts a remote stop identifier signal at step 295 to the remote sender. By receiving this information from the system, the remote user will be able to send a signal only to the vehicle which the remote user intends to stop.

Figure 3D:
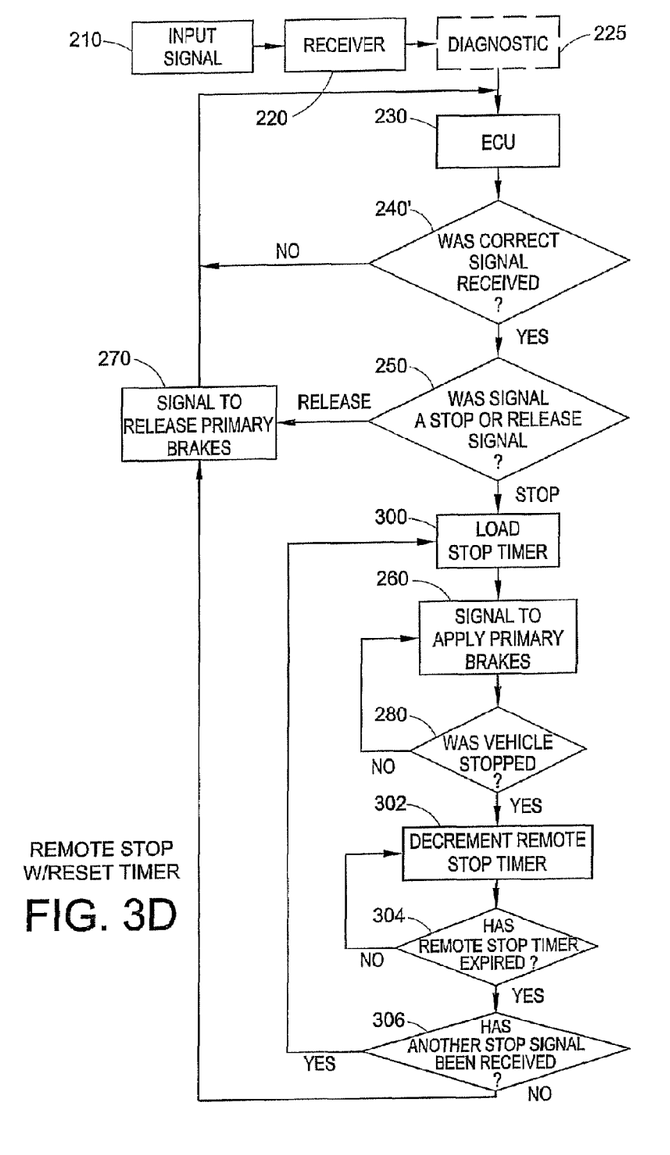
FIG. 3D is a flow diagram illustrating the stop/release method illustrated in FIG. 3A, and incorporating a reset timer sequence.

FIG. 3D illustrates a remote stop method 200'''', incorporating a reset timer sequence. After the ECU determines that a stop signal has been received at step 250, the ECU loads a stop timer at step 300. The ECU then sends the signal at step 260 to the primary brakes which are applied until the vehicle comes to a stop by cycling about step 280. Once the vehicle has come to a stop, the ECU begins to decrement the remote timer at step 302. In step 304, the ECU then determines whether the timer has expired, and if it has not, the timer continues to decrement. Once the timer has expired, the ECU determines, at step 306, whether another stop signal has been received. If another stop signal has been received, the method 200'''' loops back to loading the stop timer at step 300. If the ECU determines has not received another stop signal, the primary brakes are released at step 270 and the vehicle become operable. The reset timer sequence is employed in order to avoid rendering non-intended vehicles from remaining inoperative after receiving a non-intended stop signal.

It should be noted that the embodiments illustrated in FIGS. 3A-3D may be used in any combination to establish a desired remote stop method. An additional feature that may be encompassed into any of the remote stop methods, is the storing the remote stop signal in the non-volatile memory of the ECU in order to prevent resetting the method by restarting the vehicle.

Figure 4:
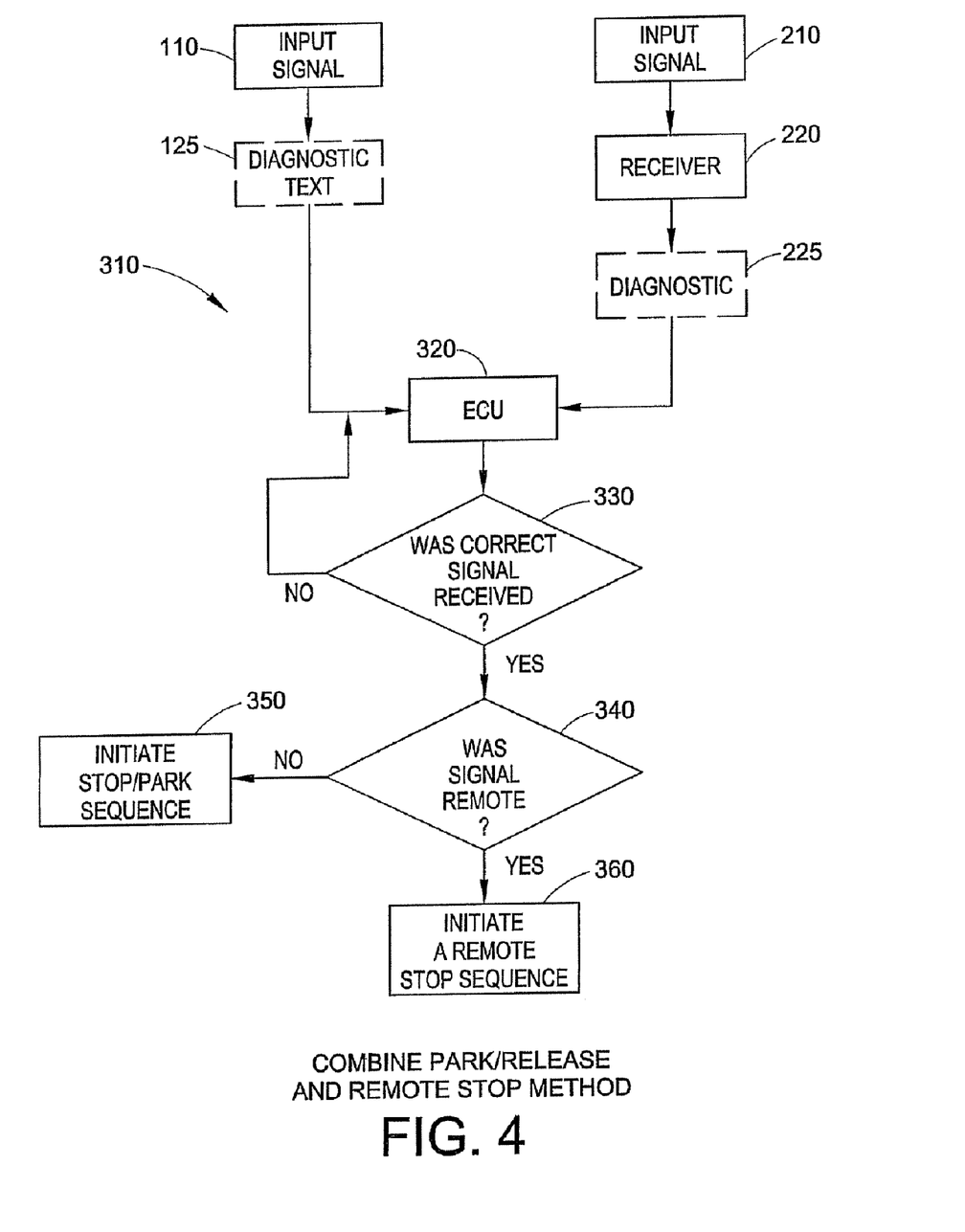
FIG. 4 is a flow diagram illustrating a combine park/release and stop/release method.

FIG. 4 illustrates a method 310 that combines the park/release and remote stop methods. A signal is generated either by an operator in step 110 or by a remote user in step 210. The signal generated by the operator is step 110 may pass through an optional diagnostic sequence at step 125 and then to the ECU 320. A signal generated by a remote user in step 210 is received by receiver 220, processed through an optional diagnostic sequence at step 225, and then sent to the ECU 320. In step 330, the ECU then determines whether the signal was authorized before processing the signal at step 340 as an operator signal, wherein a park/release sequence is initiated in step 350, or a remote signal, wherein a stop/release sequence is initiated in step 360.

Figure 5:
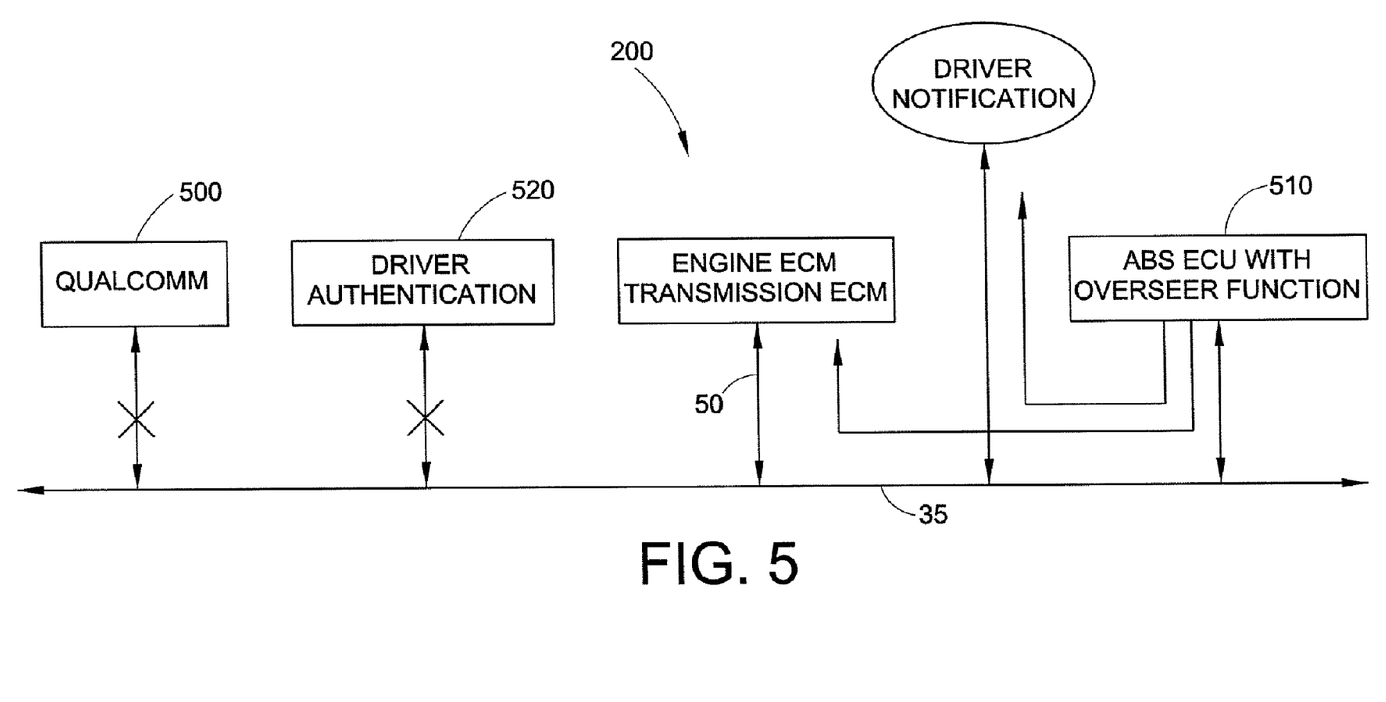
FIG. 5 is a flow diagram illustrating a method of stopping a vehicle employing a telematic device.

In another embodiment, the remote stop method 200 is combined with a telematic security system 500, such as Qualcomm, as shown in FIG. 5. In such a system, an overseer 510 can be built into the ABS ECU, into any other existing ECU on the vehicle, or as a new ECU implemented for security purposes. The overseer 510 can be used in connection with a telematic security system 500 and/or a driver authentication system 520, such as, for example, a fingerprint identification system, a voice recognition system, a magnetic strip security system, or an electronic key or access code security system. When employing a driver authentication system 520 it is preferred to run diagnostic checks, generally referenced at step 125, to ensure the driver authentication system 520 is operational. A failure in the diagnostic check of the driver authentication system 520 may commence a stop/park sequence as described above. In addition, the diagnostic step should also establish connection with the telematic security system 500, wherein the failure to establish such connection should commence a stop/park sequence.

The methods described above for stopping a vehicle can be employed using a telematic security system 500, wherein the input signal 110 is delivered from a telematic device, such as, for example, a Qualcomm satellite which is received by a corresponding receiver 220 located on the vehicle. The receiver 220 connects to an ECU 230, preferably the vehicle ABS ECU, via a communication bus, either the existing vehicle busses 35, including J2497 (PLC), J1939 (CAN), J1587 (Diagnostic) or IEEE 1394, or a new bus designed for security purposes. The ECU 320 is preferably connected to the entire security system, which may include a telematic security system, a remote-operated security system, and/or a driver authentication system, such as to allow for diagnostic system testing to ensure that the entire security system is operational. Similar to the methods described above, the ECU performs an algorithm to determine if a stop/park sequence should be commenced. Once it is determined that a stop/park sequence should commence, the ECU communicates to one or more vehicle stopping devices, including the primary brakes, the spring brakes, an engine torque reduction apparatus, an engine torque limitation apparatus, and an engine kill switch. Regardless of the method that is used to stop a vehicle, a system reset should be used to allow the vehicle to be move once the proper authorization has been provided. As mentioned above, a reset timer can be implemented to automatically reset the vehicle system after a predetermined lapsed amount of time, unless a subsequent stop/park sequence signal is received. Further, the reset system sequence may commence upon receiving an affirmative signal either generated from a remote source, a telematic signal, or a authorized user override located on or within the vehicle.

It will be appreciated that apparatus for receiving and commencing a stop/park sequence may adopt a wide variety of designs or configurations. Furthermore, one skilled in the art should appreciate that this invention may be a new apparatus, or may be adapted to retrofit existing vehicle equipment. Additionally, it should be understood that the methods illustrated in this application as merely illustrative examples of the invention and should not be constrained to the sequence or specific steps herein. As such, this invention is intended to include such modifications and alterations in so far as they fall within the scope of the appended claims or the equivalents thereof.

The invention claimed is:

1. A method for stopping a vehicle comprising the steps of:

sending a signal requesting the vehicle to stop via a telematic device;

processing the signal within a vehicle ECU;

stopping the vehicle in response to the signal;

loading a stop timer once the signal has been received;

decrementing the stop time once the vehicle has come to a stop;

determining whether another signal requesting the vehicle to stop has been received; and allowing the vehicle to be operable if the stop time has expired and another signal requesting the vehicle to stop has not been received.

2. The method of claim 1, wherein the vehicle ECU is an anti-locking brake system ECU.

3. The method of claim 1, further comprising the step of authenticating an operator's identification and transmitting an operator validation signal to said ECU.

4. The method of claim 3, wherein the step of authenticating the operator's identification is accomplished through use of one or more of the following devices: a fingerprint identification system, a voice recognition system, a magnetic strip security system, or an electronic key or access code security system.

5. The method of claim 3 further comprising the step of performing a diagnostic check to verify that the ECU is capable of receiving a operator validation signal.

6. The method of claim 5, wherein said stop sequence is commenced when said operator authentication diagnostic test fails.

7. The method of claim 1 further comprising the step of performing a diagnostic check to verify that the vehicle is capable of receiving said signal from said telematic device.

8. The method of claim 7, wherein said stop sequence is commenced when said telematic device diagnostic test fails.

9. The method of claim 1 further comprising the steps of performing a diagnostic check to verify that the vehicle is capable of receiving said signal from said telematic device and performing a diagnostic check to verify that the ECU is capable of receiving a operator validation signal.

10. The method of claim 9, wherein said stop sequence is commences when either the telematic device diagnostic test fails or the operator authentication diagnostic test fails.

11. The method of claim 1, wherein the step of allowing the vehicle to be operable comprises resetting the vehicle brake and/or engine systems.

12. The method of claim 11, wherein said step of resetting the vehicle systems is commenced via a signal set from said telematic device.

13. The method of claim 1, wherein said telematic device is a Qualcomm system.

14. The method of claim 1, wherein said signal from said telematic device is encoded.

15. The method of claim 1, wherein said telematic device further provides a vehicle identification signal.

16. The method of claim 15, further comprising the step of broadcasting a vehicle identifier signal when a vehicle stop identifier signal has been received.

17. The method of claim 1, wherein said step of stopping the vehicle further comprises sending a signal to the vehicle primary brake system, the spring brake system, the engine ECU or any combination thereof via an existing vehicle communication bus.

18. The method of claim 1, wherein the step of stopping the vehicle includes one or more of the following steps: applying a vehicle primary brake system, applying a vehicle spring brake system, applying an engine torque reducer, applying a vehicle torque limitation device, and applying an engine kill switch.

19. A method for stopping a vehicle comprising the steps of:
communicating a stop signal to a telematic device;
relaying said stop signal from said telematic device to a vehicle;
receiving said stop signal on the vehicle;
transmitting said stop signal to a vehicle ECU;
transmitting said stop signal to one or more of the following: a primary brake system, a spring brake system, and an engine ECU;
loading a stop timer;
decrementing the stop time;
determining whether another stop signal has been received; and
permitting the vehicle to move if the stop time has expired and another stop signal has not been received.

* * * * *